United States Patent Office 3,816,538
Patented June 11, 1974

3,816,538
HALOGENATED SALICOINS HAVING ANTI-PARASITIC ACTIVITIES
Hans Heinz Haeck and Willen Jan Pereboom, Weesp, Netherlands, assignors to U.S. Philips Corporation, New York, N.Y.
Filed June 18, 1971, Ser. No. 154,280
Claims priority, application Netherlands, June 20, 1970, 7009085
Int. Cl. C07c 49/80
U.S. Cl. 260—590
7 Claims

ABSTRACT OF THE DISCLOSURE

Polyhalogenated salicoins found useful for controlling liver flukes, an example being 3,3'-dichloro-5,5'-bibromo-salicoin.

Figure 1:
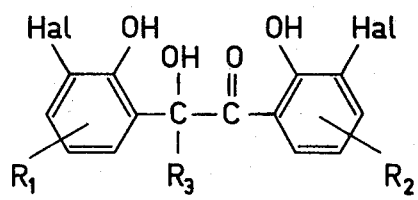
Figure 2:
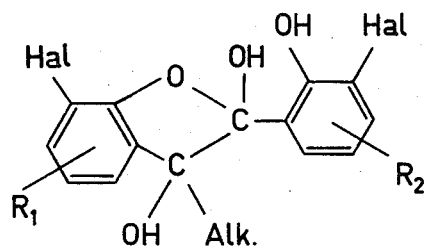
Figure 3:
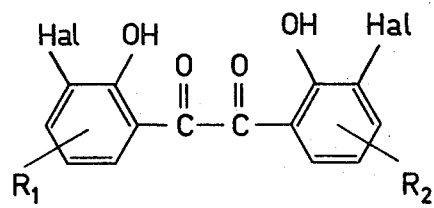

The invention relates to new salicoins of the formula I (see the accompanying drawing in which certain structural chemical formulae serially numbered I–III for identification are set out). In this formula $R_1$ and $R_2$ each are from 1 to 3 halogen atoms, whilst $R_3$ is a hydrogen atom or an alkyl group containing from 1 to 7 carbon atoms. The term "hal" or "halogen" is used in this specification to mean chlorine, bromine and iodine.

It should be noted that the compounds in which $R_3$ is an alkyl group may be in equilibrium in a solution with compounds of the formula II. Hence the invention also relates to the latter compounds.

The compounds according to the invention were found to have a potent antiparasitic activity. They proved to be active against, amongst other parasites, liver flukes.

It is of high economic importance to have medicaments for controlling liver flukes. This organism causes a damage of from 100 to 200 millions of guilders yearly in the Netherlands alone. Infected cows produce from 20 to 25 percent less milk and morover the quality of this milk is not too good. The slaughtering weight and the value of the meat also decrease. In sheep a liver fluke infection decreases the wool production both in quality and in quantity.

The compounds according to the invention are valuable also because of their activity against tapeworms and schistosomes. It is estimated that from 150 to 300 millions of human beings suffer from schistomiasis, often referred to as bilharziasis, especially in comparatively warm regions. Medicaments used hitherto for controlling schistosomes, such as antimony compounds, are not satisfactory owing to their toxic side-effects and/or unsufficient activity.

The anti-liver-fluke activity of the compounds was found in a test with rabbits infected with liver flukes.

To obtain the infectious stage the eggs of liver flukes obtained from a slaughter-house and stored in Melnick medium (Proc. Soc. Exp. Biol. Med. 81, 208 (1952)) were collected and stored in aqua destillata at 27° C. for 11 days. By light and cold stimuli the miracidia were liberated from the eggs.

Cultures of algae and snails were maintained to provide the intermediate host Lymnae truncatula to be infected.

Three weeks old snails were each infected with 5 miracidia. About 7 weeks afterwards the cercariae were liberated by mincing the snail and putting the result in water contained in a cellophane case. The metacercariae settle on the cellophane. The cases are stored under moist conditions at 40° C. Before the metacercariae are used, their viability is determined by the Wikerhauser test (Am. J. Vet. Res. 21, 895 (1960)).

About 6 weeks old rabbits were each infected with 80 viable metacercariae enclosed in a gelatine capsule. To permit testing with adult liver flukes the substance to be investigated was administered 9 weeks afterwards. After the tolerance dose had been determined, that is to say the largest amount which when administered to four mice during two consecutive days does not produce toxic phenomena within 48 hours from the last administration, the tolerance dose of the substance was admininstered to each rabbit through a rubber esophageal tube. If the tolerance dose exceeded 250 mg./kg., the latter amount was administered. Two days after the administration the rabbits were dissected. The liver flukes present in the biliary passages and the gall bladder were collected in a warm physiological salt solution. The effect of the substance on the liver flukes was judged by the method described by Lämmler (Arzneimittelforschung 5, 497–502 (1955)).

The compounds are active also against schistosomes, as was found in a test according to the principle of Pellegrino et al. (Am. J. Trop. Med. Hyg. 11, 201–215, (1962)). Female schistosomes mansoni start egg production about 40 days after entering the host. The eggs are laid immature and the ebryos need about 6 days to mature. The administration of a schistomocidal agent terminates the production of eggs by expelling the flukes to the liver, but the maturing of the eggs laid continued. After about 6 days all the immature eggs will have reached the mature stage.

The various stages are distinguished as 1st, 2nd, 3rd, 4th and mature stages. The activity of a substance is determined 7 days after the beginning of the administration by counting the number of mature eggs present in the wall of the intestine. When a substance expels the flukes towards the liver already after the first administration, from this instant no more eggs are laid in the intestinal wall. Seven days later only mature eggs are found.

Young snails (Australorbis glabratus) were infected with miracidia acquired from infected mice by putting the snails for one night in a beaker container 2 ml. of aqua bidestillata in which 10 miracidia were present. After about 1 month the snails were stimulated to produce cercaria by sudden bright illumination.

Mice were infected by the subcutaneous administration of from 50 to 100 cercaria per mouse.

Because on the 47th day after the infection all the stages are present in the intestinal wall, the test was started on this day. For this purpose, an amount of the substance to be investigated was orally administered to 7 mice for 5 days. On the 54th day after the infection the mice were dissected. Of the flukes found in the wall of the small intestine about 300 were differentiated with respect to stage by clamping three pieces of intestine between two glass slides and examining them under the microscope. In each piece 100 eggs were counted. The number of mature eggs was compared with that found in untreated infected mice.

The compounds are also active against tapeworms, as was found in tests with mice. The animals were each infected with 1,500 eggs of Hymenolepis nana. Thirteen days after the infection one dose of the substance to be investigated was administered orally. Three days later the mice were dissected and the number of worms present in the intestine was compared with that found in untreated infected mice.

The compounds according to the invention may be used, after being brought into a suitable dosage form, to control infections with flatworms, such as liver flukes, tapeworms and schistosomes.

In the treatment of patients infected with schistosomes, in general from 10 to 250 mg. of substance per kg. of weight daily will be prescribed. This amount must be administered for from 5 to 15 days. As a rule from 25 to 100 mg./kg./day will be used. These doses may be admininstered in three portions.

For controlling tape worms in man the dose will generally be from 0.5 to 2 g. daily for 1 to 3 days. The amount administered to an animal will generally be from 25 to 200 mg./kg. daily, if desired divided in several portions. For treating chickens an amount of 200 p.p.m. mixed with the feed and administered for from 2 to 3 weeks will usually be suitable.

When treating sheep, goats, cows, rabbits and such animals against liver-fluke infections, from 5 to 100 mg. of active substance per kg. of weight will generally be administered. As a rule, the dose will be between 5 and 50 mg./kg. This amount will usually be administered in a single dose. In the case of acute infections higher doses may be given.

The compounds according to the invention may be produced by methods known for the production of compounds of this type and by analogous methods.

Hence, the invention also relates to a method of producing new salicoins which is characterized in that compounds of the formula I where $R_1$ and $R_2$ each represent from 1 to 3 halogen atoms and R is a hydrogen atom or an alkyl group containing from 1 to 7 carbon atoms, are produced by methods known for the production of compounds of this type and by analogous methods.

For example, the compounds of the formula I in which $R_3$ is a hydrogen atom may be obtained by reducing the corresponding salicils of the formula III, in formula III the symbols have the same meanings as in formula I. The reaction may be performed with a sodium dithionite ($Na_2S_2O_4$).

The reaction is preferably carried out under alkaline conditions, using for example water, an alcohol or a water/alcohol mixture as a solvent. The reaction temperature is generally chosen to be between room temperature and the boiling point of the reaction mixture.

The compounds of the formula I in which $R_3$ is an alkyl group may be obtained from the corresponding compounds of the formula III by a Grignard reaction with an alkyl magnesium halide containing from 1 to 3 carbon atoms as a reagent. Suitable solvents are the usual solvents, such as diethyl ether, tetrahydrofurane, dioxan and the like. The compounds of the formula III may *inter alia* be obtained by oxidation, for example with ammonium nitrate, of the corresponding benzoins which may be produced from the corresponding benzaldehydes with KCN.

The compounds of the formula I may be worked up into pharmaceutical and veterinary preparations by usual methods. They may be mixed with, or dissolved in, the usual solid or liquid carrier materials to prepared pills, tablets, rod tablets, capsules, injection liquids, powders, suspensions and the like.

Accordingly the invention also relates to a method of producing anti parasitic preparations, which is characterized in that a compound of the formula I, where $R_1$ and $R_2$ each represent from 1 to 3 halogen atoms and $R_3$ is a hydrogen atom or an alkyl group containing from 1 to 7 carbon atoms, is dissolved in, or mixed with liquid or solid carrier materials.

The substances may be mixed with equal amounts of starch or lactose to produce pills. Tablets may be made, for example, from 500 mg. of active substance, 1 g. of corn meal, 7 g. of talc, 0.5 g. of magnesium stearate and 1.5 g. of lactose, or from 50 mg. of active substance, 1 g. of starch, 0.5 g. of calcium carbonate, 0.5 g. of calcium phosphate and 1.5 g. of lactose.

The substances may also be mixed with usual feeds or premixes.

EXAMPLES 1. 1,2-bis(3,5-dibromo-2-hydroxyphenyl)-2-hydroxypropanone-1

A solution of 10.65 g. of methyl iodide in 50 ml. of diethyl ether was added drop by drop to 1.82 g. of Mg in 40 ml. of ether. The mixture was added drop by drop in 15 minutes to a suspension of 11.1 g. of 3,3',5,5'-tetrabromosalicil in 250 ml. of ether. After refluxing for 2 hours an $NH_4Cl$ solution was added and the reaction mixture was acidified. The ethereal layer was separated, washed with water and dried over $Na_2SO_4$. After evaporation of the ether the residue was boiled with dichloroethane; the deposit was drawn off. When the mother liquor was allowed to stand for some time some more initial product crystallized out. The mother liquor was evaporated to dryness and chromatographed on a silicagel column. This yielded a substance which after crystallization from 1,2-dichloroethane melted at 198–200° C. with decomposition.

2. 3,3',5,5'-tetrabromosalicoin 13.74 g. (30 mmole) of 3,3',5,5'-tetrabromosalicil was dissolved in a mixture of 60 ml. of 2 N sodium hydroxide and 120 ml. of ethanol. A solution of 12 g. of sodium dithionite in 50 ml. of water was added while stirring. The reaction mixture was stirred at 50° C. for 1 hour. After being cooled to 20° C. it was acidified with 90 ml. of 2 N hydrochloric acid. The resulting precipitate was drawn off, washed with water and dried. Melting point 170–175° C. After recrystallization from 180 ml. of dichloro-ethane the melting point was 178–180° C. (with gas evolution).

3. 3,3'-dichloro-5,5'-dibromosalicoin

This substance was obtained by the method described in Example II, starting from 3,3'-dichloro-5,5'-dibromosalicil. Melting point 178–181° C.

4. 3,3'-dichloro-5,5'-diiodosalicoin

This substance was obtained in a corresponding manner by starting from 3,3'-dichloro-5,5'-idiodo-salicil. Melting point 200–204° C.

What is claimed is:

1. As novel compounds, salicoins of the formula I

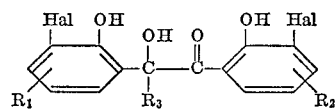

where the symbols have the same meaning as in the forgen atoms selected from the group consisting of chlorine, bromine and iodine and $R_3$ is a moiety selected from the group consisting of hydrogen or alkyl containing from 1 to 7 carbon atoms.

2. A method characterized in that compounds of the claim 1 in which $R_3$ is a hydrogen atom are produced by reducing by means of sodium dithionite compounds of the formula III,

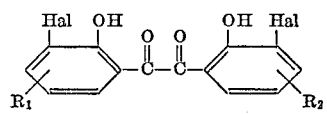

where the symbols have the same meanings as in the formula I.

3. Compounds of claim 1, where $R_1$ and $R_2$ each represent from 1 to 3 halogen atoms and $R_3$ is a hydrogen atom or an alkyl group containing from 1 to 7 carbon atoms.

4. As a compound of claim 1, 1,2-bis(3,5-dibromo-2-hydroxyphenyl)-2-hydroxy-propanone-1.

5. As a compound of claim 1, 3,3',5,5'-tetrabromosalicoin.

6. As a compound of claim 1, 3,3'-dichloro-5,5'-dibromosalicoin.

7. As a compound of claim 1, 3,3'-dichloro-5,5'-diiodosalicoin.

References Cited

Richter, Textbook of Organic Chemistry, pp. 548–549 (1938).

Hiroshi et al., Chem. Abstracts, 54, 24695a (1960).

DANIEL D. HORWITZ, Primary Examiner

U.S. Cl. X.R.

424—331

UNITED STATES PATENT OFFICE
CERTIFICATE OF CORRECTION

Patent No. 3,816,538　　　　　　　　　Dated June 11, 1974

Inventor(s) HANS HEINZ HAECK ET AL

It is certified that error appears in the above-identified patent and that said Letters Patent are hereby corrected as shown below:

Column 1, line 4, "Willen" should be -- Willem --.

Column 4, line 56, cancel this line and rewrite as follows:

-- where, Hal, $R_1$ and $R_2$ each represent from 1 to 3 halo- --.

Signed and sealed this 1st day of October 1974.

(SEAL)
Attest:

McCOY M. GIBSON JR.　　　　　　　C. MARSHALL DANN
Attesting Officer　　　　　　　　Commissioner of Patents